United States Patent [19]
Helmecke

[11] Patent Number: 6,034,826
[45] Date of Patent: Mar. 7, 2000

[54] OPTICAL INSTRUMENT FOR OBSERVING SURFACE ENGRAVINGS ON OPTICAL LENSES

[75] Inventor: George Helmecke, Fort Lee, N.J.

[73] Assignee: Optivision Ltd., Cliffside Park, N.J.

[21] Appl. No.: 09/028,775

[22] Filed: Feb. 24, 1998

[51] Int. Cl.[7] .......................... G02B 27/02; G02B 21/00
[52] U.S. Cl. ...................... 359/798; 359/801; 359/800; 359/368
[58] Field of Search ..................... 359/798, 799, 359/800, 802, 368, 369, 388, 382, 390, 819, 811

[56] References Cited

U.S. PATENT DOCUMENTS

| | | | |
|---|---|---|---|
| 2,239,032 | 4/1941 | Boch | 40/367 |
| 2,289,272 | 7/1942 | Kibbe | 359/799 |
| 2,645,869 | 7/1953 | Cook | 353/112 |
| 2,656,758 | 10/1953 | Cole | 359/475 |
| 2,934,993 | 5/1960 | Chromy | 356/30 |
| 3,171,883 | 3/1965 | Jones | 356/239.2 |
| 3,232,302 | 2/1966 | Methot | 453/44 |
| 4,577,927 | 3/1986 | Raney | 350/235 |
| 4,906,083 | 3/1990 | Sattler | 350/524 |
| 5,052,802 | 10/1991 | Hayes et al. | 356/237 |
| 5,144,495 | 9/1992 | Merton et al. | 359/798 |
| 5,757,542 | 5/1998 | Brock | 359/390 |
| 5,781,338 | 7/1998 | Kapitza et al. | 359/398 |

OTHER PUBLICATIONS

"Spectacle Lens Technology", D.F. Horne, M.B.E., 1978, p. 118.
Brochure, "Progressive Addition Lens Identification Device", Optivision 1996.

Primary Examiner—Georgia Epps
Assistant Examiner—Suzanne Letendre
Attorney, Agent, or Firm—Nicholas S. Whitelaw; Everett G. Diederiks, Jr.

[57] ABSTRACT

An optical instrument for facilitating the observation of surface engravings located on an optical lens includes a base housing having a light source therein for illuminating the optical lens. An image contrastor, selected based on the type of lens to be examined, is placed on the base housing over the light source. The image contrastor includes its own housing within which is positioned a viewing plate and a light diffuser. A screening pattern or coating is formed on the viewing plate to define a backdrop for examining the lens. A support member extends from the base housing and carries a magnifying lens. With this arrangement, an optical lens may be placed between the image contrastor and the magnifying lens to enhance the observation of engravings on the optical lens.

23 Claims, 3 Drawing Sheets

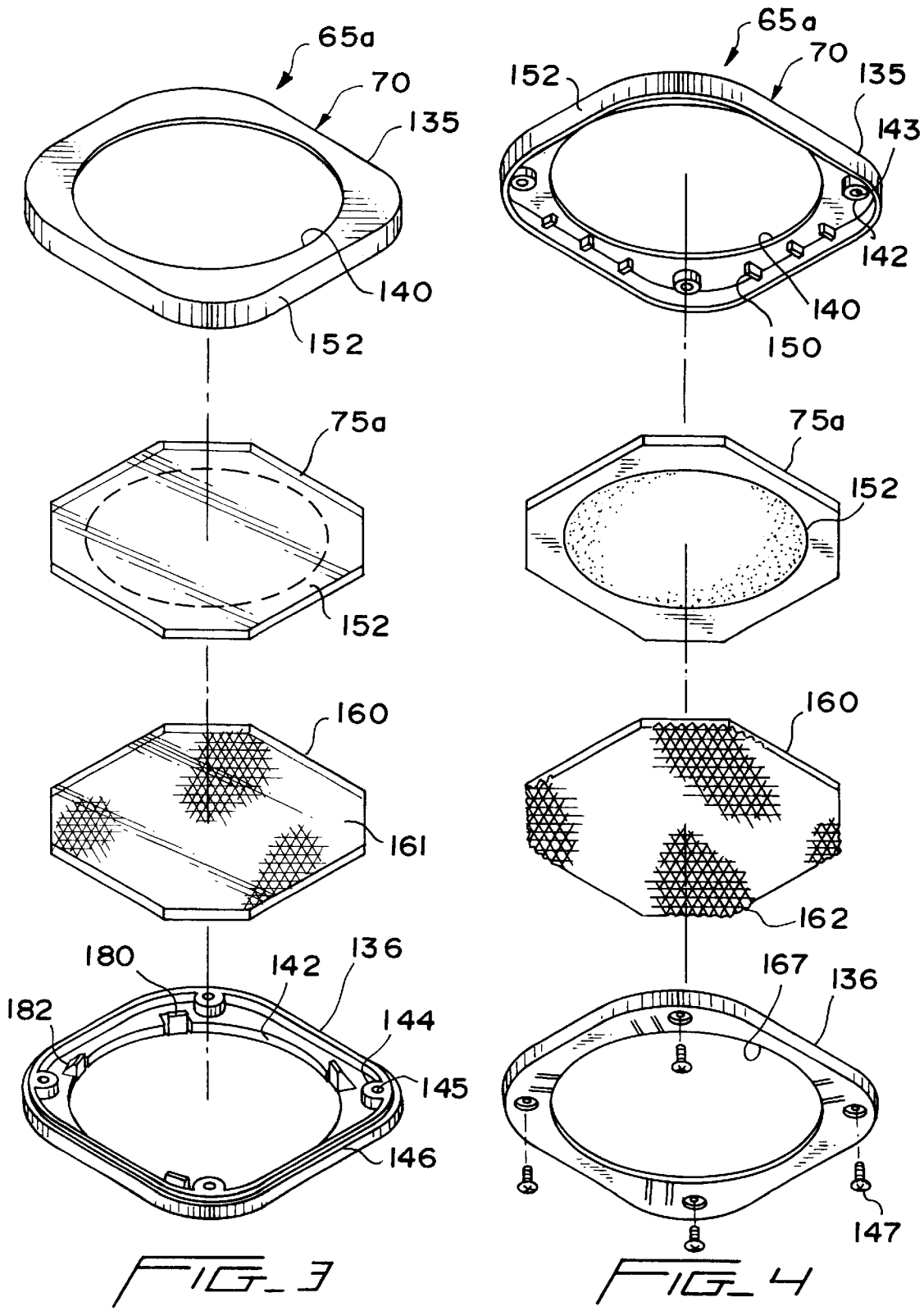

OPTICAL INSTRUMENT FOR OBSERVING SURFACE ENGRAVINGS ON OPTICAL LENSES

BACKGROUND OF THE INVENTION

1. Field of the Invention

This invention relates to an optical instrument for facilitating in the observation of surface engravings located on an optical lens.

2. Description of the Prior Art

Conventional multi-focal lenses are formed by joining two or more sub-lenses of different optical power together to form a final composite lens. For example a composite lens could be formed from two different sub-lenses having different optical powers. Such a lens, commonly called a bifocal lens, usually has a line formed between the two sub-lenses. Therefore, these lenses have clear reference points to aid an optical practitioner in positioning the lens when it is worked on. Furthermore, since the optical power of each sub-lens is constant within the particular sub-lens, the power of each sub-lens can be easily measured.

In order to remove the line formed between sub-lenses of differing optical powers, it has now become somewhat common to mold the front surface of a multi-focal lens in such a way as to form a gradual set of curves from different areas of the lens. A variation of curves results in refractive power variation from distance to near corrections without the need for specific power segments or lines. Such a lens is commonly referred to as a progressive addition lens. The lines formed in previous multi-focal lenses were not considered aesthetically pleasing and, in fact, the lines formed in the lenses could interfere with the vision of the user. However, with progressive addition lenses, visual correction from one refractive power zone to the next is smooth. For at least this reason, progressive addition lenses are considered more comfortable and have been favorably accepted by users. In general, this new lens design presented a large technological advancement over multi-focal lenses and, as a result, tens of millions of progressive addition lenses are being worn around the world today, with more than ninety types produced by more than two dozen manufacturers.

Unfortunately, unlike lined or conventional multi-focal or bifocal lenses, progressive addition lenses to not have obvious reference points for positioning each lens during processing or inspection by an optician or optical technician. Furthermore, since the front surface of a progressive addition lens is aspheric, it is very difficult to determine the power of the lens or its optical center with manual or automatic lens reading instruments currently available in the optical industry.

In an attempt to overcome this problem, it has become commonplace for manufacturers of progressive addition lenses to engrave informational markings on the front surfaces of these lenses. Such markings typically include geometric symbols indicating various properties of the lens, such as the horizontal centerline, optical power, manufacturer, specific model and other pertinent information. These engravings typically vary from bold to extremely faint. To further complicate matters, the optical qualities of the engravings on plastic and glass lenses are different. Since the introduction of progressive addition lenses, manufacturers of such lenses have varied the engraving depth, as well as the particular locations of the markings so as to be unobtrusive and unnoticeable to the wearer. Unfortunately, available devices used to observe these markings are not considered satisfactory such that locating and identifying the markings on a wide range of lenses has generally represented a time consuming and arguous task. This problem is particularly prevalent when attempting to read rather old lenses which may be scratched and/or coated.

Based on the above, there exists a need in the art for an optical instrument for facilitating the observation of surface engravings located on an optical lens. More particularly, there exists a need for a device which will allow even faint engravings on an optical lens to be readily viewed by an optical practitioner. In addition, there exist a need for such an optical instrument which can be used in viewing engraving in both plastic and glass lenses. Furthermore, there exists a need for an optical instrument which is simple in construction and is easily adapted for use with little or no special training.

SUMMARY OF THE INVENTION

The present invention is directed to an optical instrument for facilitating the observation of surface engravings located on an optical lens, particularly a progressive addition lens. More specifically, the instrument comprises a base housing containing a light source. The light source is preferably constituted by a pair of fluorescent bulbs mounted within the housing, below a recessed area formed in an upper surface of the housing. A reflective surface arrangement is provided behind the bulbs to enhance the lighting. In the most preferred form, the light bulbs are powered by household electric current and therefore a power cord extends from the housing. A switch is also mounted on the housing to selectively turn the bulbs on or off. Vents are provided in lower surfaces of the housing to enhance cooling of the instrument. An upper surface of the housing is formed with a recessed area having an associated shelf or ledge which extends along the periphery of a hole which opens to the bulbs in the housing. This ledge is particularly designed to support a selected image contrasting unit provided as part of the optical instrument.

In accordance with the most preferred embodiment, different image contrasting units are used with the optical instrument depending on what type of optical lens is to be inspected. Each image contrasting unit preferably comprises an encasement or housing formed from a pair of interconnected housing parts or casings. The first housing part is of a generally square shape having rounded corners and a rather large, preferably circular central hole. Four mounting holes are provided, one at each corner area of the first housing part and locating ribs are provided along each side thereof.

A transparent viewing plate of polygonal shape is arranged in the first housing part and maintained in a desired position by the locating ribs. The plate is preferably made of plastic and has a silk screening or masking pattern thereon. For viewing a glass optical lens, the pattern is opaque, preferably circular in shape with a diameter slightly smaller than the diameter of the central hole. For viewing a plastic optical lens, the pattern is preferably co-extensive with the plastic lens, at least in the area of the central hole. In accordance with one preferred form of the invention, this pattern is defined by a transparent, colored filter layer having dot apertures with aperture diameters of approximately 0.02 inches (0.5 mm), with the dot apertures being spaced approximately 0.05 inches (1.2 mm) apart. A polygonal diffuser plate is placed over the lens and is also held in place by the locating ribs. The second housing part is commensurately shaped to the first casing and is also provided with a rather large, preferably circular central hole, four spaced mounting holes and a contoured outer periphery which mates with related structure on the first housing part. Screws are used to interconnect the first and second housing parts at the mounting holes to hold the entire assembly together. An inner peripheral surface of the second housing part is provided with four positioning legs which abut the diffuser and securely retain the diffuser and viewing plate against the first housing part.

With this arrangement, a selected one of the image contrastors may be placed upon the ledge and over the bulbs in the base housing. In the preferred embodiment, the contrastor is simply held in place by gravity. A separate, generally L-shaped support extends from the base housing and contains a magnifying lens. In the most preferred embodiment, the magnifying lens preferably has a +7.00 diopter correction. Once an appropriate image contrastor is placed in the base housing and the light source is activated, a progressive addition lens having engravings to be observed can be placed between the selected image contrastor and the magnifying lens. By simply shifting the lens slightly towards or away from the magnifying lens, any engravings in the progressive addition lens can be clearly seen and identified by an optical practitioner looking through the magnifying lens.

Additional objects, features and advantages of the present invention will be more readily apparent from the following description of the preferred embodiment thereof, when taken in connection with the drawings wherein like reference numerals refer to corresponding parts in the several views.

BRIEF DESCRIPTION OF THE DRAWINGS

FIG. 3 is an upper exploded view of an image contrastor unit constructed in accordance a second preferred embodiment of the invention; and FIG. 4 is a lower exploded view of the image contrastor unit shown FIG. 3.

DETAILED DESCRIPTION OF THE PREFERRED EMBODIMENTS

Figure 1:
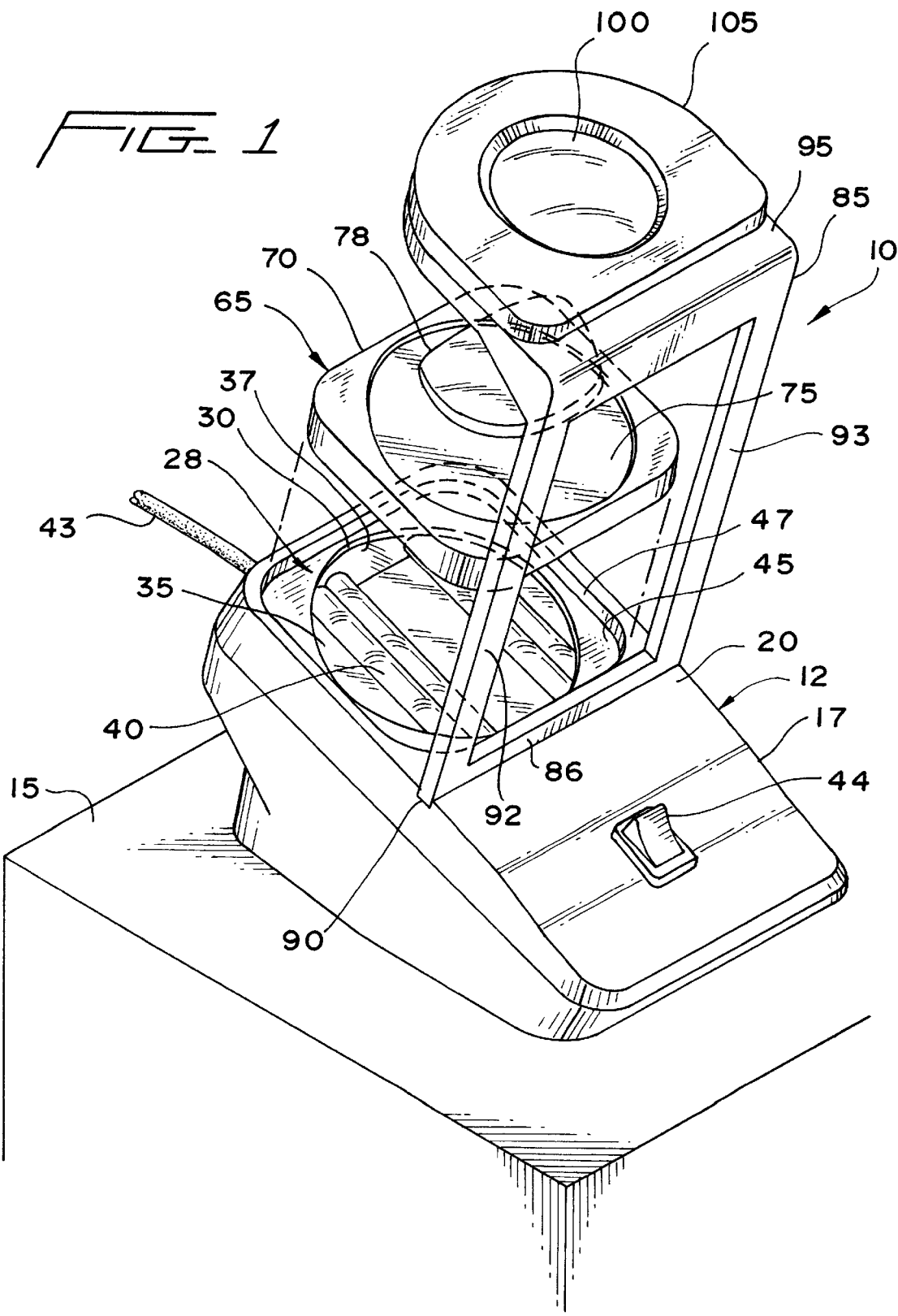
FIG. 1 is an upper perspective view of an optical instrument, shown incorporating a first image contrastor unit, constructed in accordance with the present invention.

With initial reference FIG. 1, an optical instrument constructed in accordance with the present invention is generally indicated at 10. As shown, instrument 10 includes a base unit 12 which, as depicted, is adapted to rest on a supporting surface 15, such as a table, countertop or the like. Base unit 12 includes a housing 17, preferably formed from plastic, having a top surface 20. Formed in an upper section of top surface 20 is a recessed area 28 and a hole 30 which lead to within housing 17. A reflective panel 35 is mounted within housing 17 directly below hole 30. In addition, reflective side walls 37 are also provided. Preferably, these reflective elements are formed from thin polished aluminum panels which are designed to increase the amount of light emanating from hole 30.

Within housing 20 are mounted two light sources 40, each of which is preferably constituted by a fluorescent, seven watt bulb. Of course, as will become readily apparent after reading this description, light sources 40 could also be constituted by other known types of lighting units without departing from the spirit of the invention. In any event, light sources 40 are preferably connected by internal wiring (not shown) and a power cord 43 that can be inserted into a typical household electrical outlet. A switch 44 is provided in the internal electrical wiring, between the power cord 43 and the two light sources 40, for enabling an operator to control the activation state of instrument 10. As shown, switch 44 is preferably mounted in top surface 20, but switch 44 could be easily relocated without altering its intended function.

Recessed area 28 is defined by a ledge or shelf 45 which extends inwardly from an annular side wall 47. Shelf 45 actually defines hole 30, which is preferably circular and located in the center of recessed area 28. Side wall 47 and shelf 45 are adapted to locate and support an image contrastor 65 positioned within recessed area 28. As will be detailed below, different types of image contrastors 65 are preferably used in accordance with the present invention depending on the particular type of optical lens being examined. At this point, it is simply important to note that image contrastor 65 can be easily positioned for use in instrument 10 and retained therein by shelf 45, annular side wall 47 and gravity. With this mounting arrangement, image contrastor 65 can be readily removed and replaced as needed. Although the preferred construction of image contrastor 65 will become more fully evident below, in general, image contrastor 65 includes an encasement 70 containing a view contrasting plate 75 functioning as a backdrop for the viewing of a particular lens 78.

Before detailing the structure of image contrastor 65, additional structural features of housing 12 and the other components of instrument 10 will now be described with continued reference to FIG. 1. As shown, projecting upwardly from top surface 20 is a generally L-shaped support member 85. More specifically, L-shaped support member 85 includes a lower crosspiece 86 mounted in a slot 90 formed in top surface 20. L-shaped support member 85 is preferably made of aluminum and also includes a pair of laterally spaced, upstanding legs 92 and 93 which supports a mounting ring 95 in a cantilevered manner. With this arrangement, ring 95 is maintained spaced from the top surface 20 of the base 12 by a distance generally defined by the length of each leg 92, 93. In the preferred embodiment, this distance is in the order of 7–7.5 inches (approximately 17.75–19 cm). Ring 95 includes a through hole (not shown) at which is mounted a magnifying lens 100. A magnifying lens encasement 105 is secured upon ring 95 and retains magnifying lens 100 in place. Based on this construction, it should be apparent that lens 100 is maintained a fixed distance above recessed area 28 and, correspondingly, above image contrastor 65 positioned within recessed area 28. In the preferred embodiment, magnifying lens 100 is formed of optical quality ground glass having a +7.00 diopter.

Figure 2:
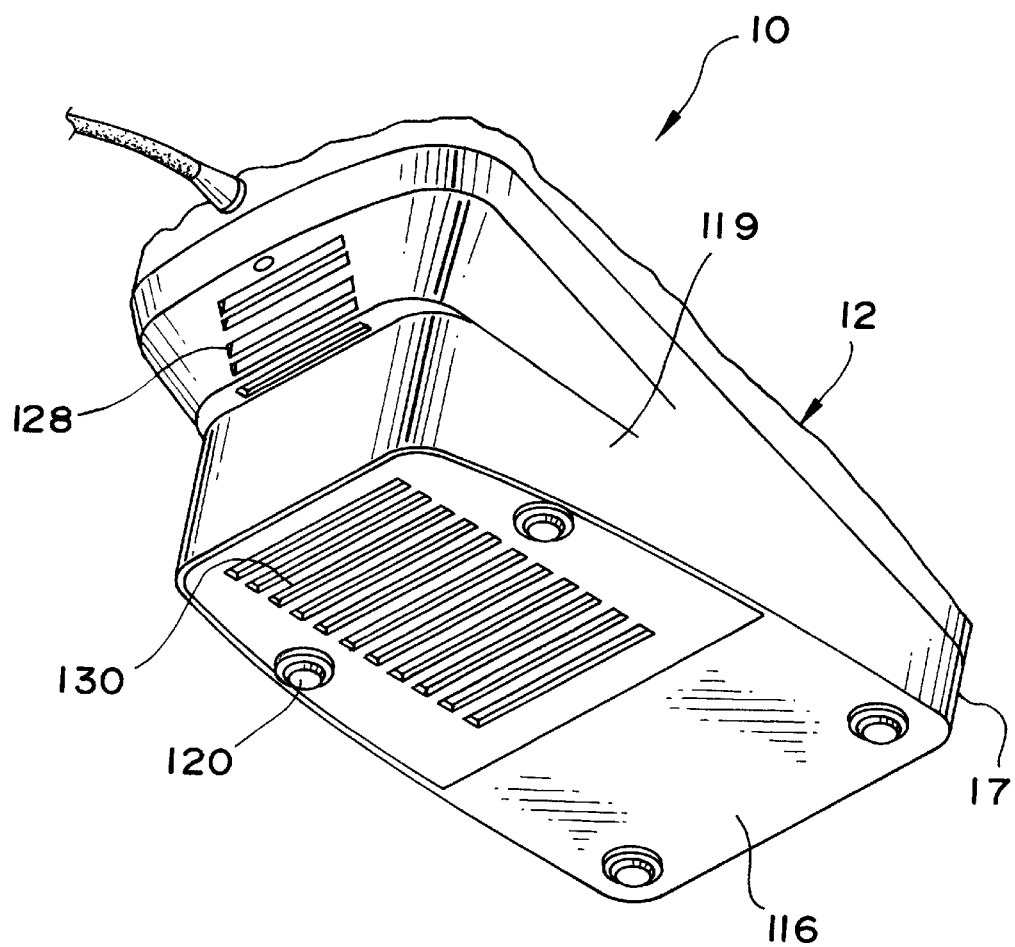
FIG. 2 is a lower perspective view of the optical instrument shown in FIG. 1.

FIG. 2 best illustrates the lower portion of housing 12 which includes a generally flat bottom portion 116 from which projects an integral upstanding body portion 119. Body portion 119 has a greater associate height at the rear of housing 12 as compared to at the front thereof such that top surface 20 generally slopes upward from front to back. This arrangement enhances the viewing angle for instrument 10 upon supporting surface 15. To minimize any undesirable shifting of instrument 10 during operation, a plurality of rubber pads 120 are positioned about bottom portion 116. In addition, to aid in dissipating heat generated by bulbs 35, first and second sets of vent slots 128 and 130 are provided in body portion 119 and bottom 116 respectively.

Turning now to FIGS. 3 and 4, there is shown an exploded view of an image contrastor, generally indicated at 65a, constructed in accordance with a second embodiment of the invention. As will become more fully evident below, image contrastor 65a is constructed identical to image contrastor 65 except for the replacement of plate 75. More specifically, each contrastor 65, 65a includes an encasement or housing 70 preferably molded of plastic with a first casing or housing part 135 and second casing or housing part 136. Each of the first and second housing parts 135 and 136 is preferably constituted by a four-sided member having rounded corners. However, the preferred shape of encasement 70 should not be considered a limiting factor of the invention. Instead, it is merely important that each encasement 70 fits rather snugly within recessed area 28. In each of the first and second housing parts 135, 136 is formed an enlarged hole 140 and 142 respectively. Holes 140 and 142 are adapted to be aligned when first and second housing parts 135 and 136 are secured together.

For use is securing first and second housing parts 135 and 136 together, first housing part 135 is also formed with a plurality of mounting bosses 142 having associated mounting bores 143. In a similar manner, second housing part 136 is formed with a plurality of mounting bosses 144 which have associated apertures 145. In addition, second housing part 136 includes an annular plateau portion 146 upon which first housing part 135 is seated. With this arrangement, first and second housing parts 135 and 136 can mated and secured together through the use of screws 147 which extend within apertures 145 and are threadably secured within bores 143.

First housing part 135 is further formed with a plurality of internal locating ribs 150 projecting from an annular side wall 152 thereof. A viewing plate 75a, preferably having a generally octagonal shape, is positioned in first housing part 135 and maintained in a desired position by locating ribs 150. In the most preferred form, viewing plate 75a is made of a plastic material, i.e., PLEXIGLAS, and has a silk screen or masking pattern placed thereon. In essence, the only difference between image contrastors 65 and 65a concerns differences in viewing plates 75a. More specifically, viewing plate 75 is particularly adapted for use in viewing plastic optical lenses, such as lens 78. For this purpose, the screen or pattern on viewing plate 75 is preferably co-extensive with the viewing plate 75 and permits a percentage of the light developed by light sources 40 to shine there through. In the most preferred embodiment, viewing plate 75 comprises a dot pattern with approximately 0.02 inch (0.5 mm) aperture diameters, with the aperture dots being spaced approximately 0.05 inches (1.2 mm) apart from each other. Also a green screening is preferably used to create a commensurately colored backdrop for viewing lens 78. It has been found that the green backdrop enhances the ability to readily locate and read engravings on plastic addition lenses, while reducing any glare so as to be generally soothing to the eyes of the user of instrument 10. However, it should be recognized that other colors could also be used including, but not limited to, amber. In any event, it is important to note that viewing plate 75 creates a rather bright colored backdrop against which the lens 78 can be viewed through magnifying lens 100.

As indicated above, the engravings on glass lenses are generally made quite shallow and therefore can be more difficult, if not impossible, to read with a bright backdrop. To address this potential problem, instrument 10 can also be used with contrastor 65a. Like viewing plate 75, viewing plate 75a is preferably formed from a transparent plastic material. However, viewing plate 75a is provided with an opaque, preferably circular central zone 152 having a diameter slightly smaller than the diameter of hole 140 in first housing part 135. Therefore, when viewing plate 75a is placed in recessed area 28 and light sources 40 are activated, the opaque central zone 152 will not permit light to shine there through but will present a dark, preferably black backdrop for viewing the glass lens engravings. However, since central zone 152 is smaller than hole 140, with central zone 152 preferably having a diameter in the order of 85% that of hole 140, light will project about opaque central zone 152 to aid the viewing operation.

Regardless of the particular viewing plate 75 or 75a utilized, each contrastor 65 and 65a also preferably incorporates a polygonal diffuser plate 160. In the most preferred form, diffuser plate 160 is made of plastic (PLEXIGLAS), with a smooth upper surface 161 placed in engagement with a respective viewing plate 75, 75a and a lower surface 162 having an abundance of pyramid-like projections (not separately labeled). When positioned in first housing part 135, diffuser plate 160 is also retained in place by locating ribs 150. To further aid in retaining the viewing plate 75, 75a and diffuser plate 160 in a fixed position between first and second housing parts 135 and 136, second housing part 136 is provided various annularly spaced and resilient positioning fingers or side-view and is only integrated with second housing part 136 at the outermost side 182 thereof. Therefore, the lateral sides of each finger 180 are spaced from second housing part 136 in order to enable a limited amount of deflection of the finger 180. With this arrangement, when first and second housing parts 135 and 136 are secured together with screws 147, fingers 180 abut lower side surface 162 of diffuser plate 160 to bias diffuser plate 160 against the respective viewing plate 75, 75a.

In operation, an optical practitioner would first select the appropriate image contrastor 65, 65a based on the type of optical lens to be examined. Again, for glass optical lenses, image contrastor 65a would be selected and, for examining plastic optical lenses, image contrastor 65 having the dot pattern would be used. The appropriate image contrastor 65, 65a would then be placed against ledge 45 in recessed area 28 (note that contrastor 65 is shown out of recessed area 28 in FIG. 1 merely to aid in illustrating the internal structure of housing 12). Next, switch 55 would be turned on in order to illuminate fluorescent bulbs 40. While viewing through magnifying lens 100 from about 10–12 inches (approximately 25.4–30.5 cm), an optical lens 78, whether alone or in a frame, would then be initially positioned approximately half way between the image contrastor 65, 65a and the magnifying lens 100, with the curved side of the lens 78 being arranged closest to the magnifying lens 100. Depending on the power of the lens 78 being viewed, the lens 78 may need to be moved closer or further away from magnifying lens 100 in order to obtain the best viewing. For example, high minus power lenses are best observed when nearer to the image contrastor 65, 65a. For best results, the lens 78 should the cleaned with alcohol before viewing as necessary. If the particular lens being viewed is still in a frame, the operator will need to be careful to assure that the temples do not block the light source 40. In this case, angling the frame may also help in fully exposing the light source 40.

It should be noted that not all progressive addition lenses have engravings. For example, some low quality lenses may never have been engraved and some anti-reflection coated lenses may have simply lost their engravings during acid etching, which is typically used prior to the application of the anti-reflection coating. In any event, if engravings are present, viewing instrument 10 can greatly enhance the ability to observe and identify the markings.

Although described with respect to preferred embodiments of the invention, it should be understood that various changes and/or modifications can be made to the invention without departing from the spirit thereof. Therefore, the specific embodiments disclosed herein are to be considered illustrative and not restrictive. Instead, the invention is only intended to be limited by the scope of the following claims.

I claim:

1. An image contrastor comprising:
   a housing adapted to be positioned between a light source and a magnifying lens of an instrument used for observing engravings on an optical lens;
   a viewing plate mounted in said housing;
   a screen formed on said viewing plate for controlling an amount of light permitted to pass through the viewing plate; and
   a light diffuser plate mounted in said housing juxtaposed said viewing plate.

2. The image contrastor according to claim 1, wherein said housing includes a first housing part having a first hole provided therein and a second housing part having a second hole provided therein, said second housing part being secured to said first housing part to capture said viewing plate and said light diffuser within said housing.

3. The image contrastor according to claim 1, further comprising: locating ribs provided in said housing, said viewing plate being positioned against said locating ribs to prevent radial shifting of said viewing plate within said housing.

4. An image contrastor comprising:
   a housing adapted to be positioned between a light source and a magnifying lens of an instrument used for observing engravings on an optical lens;
   a viewing plate mounted in said housing;
   a screen formed on said viewing plate for controlling an amount of light permitted to pass through the viewing plate; and
   a plurality of resilient positioning members provided on said housing, said positioning members anally retaining said viewing plate within said housing.

5. An image contrastor comprising:
   a housing adapted to be positioned between a light source and a magnifying lens of an instrument used for observing engravings on an optical lens;
   a viewing plate mounted in said housing;
   a screen formed on said viewing plate for controlling an amount of light permitted to pass through the viewing plate, wherein said screen is opaque.

6. The image contrastor according to claim 5, wherein said housing includes a first housing part having a first hole provided therein and a second housing part having a second hole provided therein, said second housing part being secured to said first housing part to capture said viewing plate within said housing, said screen being aligned with, but smaller in size than, said first hole.

7. The image contrastor according claim 6, wherein said screen is circle in shape and has an associated diameter which is less than a diameter of the first hole, said viewing plate being transparent in a zone radially between said screen and said first hole.

8. The image contrastor according to claim 5, further comprising: locating ribs provided in said housing, said viewing plate being positioned against said locating ribs to prevent radial shifting of said viewing plate within said housing.

9. An image contrastor comprising:
   a housing adapted to be positioned between a light source and a magnifying lens of an instrument used for observing engravings on an optical lens;
   a viewing plate mounted in said housing:
   a screen formed on said viewing plate for controlling an amount of light permitted to pass through the viewing plate, wherein said screen comprises a dot pattern of apertures.

10. The image contrastor according to claim 9, wherein said dot pattern includes apertures spaced approximately 0.05 inches (1.2 mm) apart, each aperture having a diameter of approximately 0.02 inches (0.5 mm).

11. An optical instrument for facilitating the observation of surface engravings located on an optical lens, said instrument comprising:
    a base;
    at least one light source mounted in said base;
    an image contrastor including a housing, a viewing plate mounted in said housing and a screen formed on said viewing plate, said image contrastor being positioned on said base and over said at least one light source, with the screen controlling an amount of light permitted to pass through the viewing plate positioned on said base;
    a support extending from said base; and
    a magnifying lens secured to said support, wherein, when an optical lens is placed between said image contrastor and said magnifying lens and light from said at least one light source projects through the viewing plate of said image contrastor, engravings on the optical lens may be observed through said magnifying lens.

12. The optical instrument according to claim 11, further comprising: a light diffuser plate mounted in said housing juxtapose said viewing plate.

13. The optical instrument according to claim 12, wherein said housing includes a first housing part having a first hole provided therein and a second housing part having a second hole provided therein, said second housing part being secured to said first housing part to capture said viewing plate and said light diffuser within said housing.

14. The optical instrument according to claim 11, further comprising: locating ribs provided in said housing, said viewing plate being positioned against said locating ribs to prevent radial shifting of said viewing plate within said housing.

15. The optical instrument according to claim 11, further comprising: a plurality of resilient positioning members provided on said housing, said positioning members axially retaining said viewing plate within said housing.

16. The optical instrument according to claim 11, wherein said screen is opaque.

17. The optical instrument according to claim 16, wherein said housing includes a first housing part having a first hole provided therein and a second housing part having a second hole provided therein, said second housing part being secured to said first housing part to capture said viewing plate within said housing, said screen being aligned with, but smaller in size than, said first hole.

18. The optical instrument according claim 17, wherein said screen is circle in shape and has an associated diameter which is less than a diameter of the first hole, said viewing plate being transparent in a zone radially between said screen and said first hole.

19. The optical instrument according to claim 11, wherein said screen comprises a dot pattern of apertures.

20. The optical instrument according to claim 11, wherein said at least one light source comprises at least one fluorescent bulb.

21. The optical instrument according to claim 20, further comprising: a reflective surface located behind the at least one fluorescent bulb.

22. The optical instrument according to claim 11, wherein said base has a top surface formed with a recessed area for receiving said image contrastor.

23. A method of observing surface engravings located on an optical lens comprising:

selecting a desired image contrastor, having a housing, a viewing plate mounted in the housing and a screen formed on said viewing plate, from a plurality of image contrastors depending upon the type of optical lens to be observed;

positioning the desired image contrastor in a recessed area formed in a base portion of an optical instrument;

illuminating a zone within the base portion below the viewing plate of said desired image contrastor;

positioning the optical lens to be observed between the desired image contrastor and a magnifying lens supported in spaced relationship from the recessed area; and repositioning the optical lens relative to the magnifying lens and the desired image contrastor, while viewing the optical lens through the magnifying lens, in order to observe surface engravings on the optical lens.

* * * * *